United States Patent
Whitlock et al.

(10) Patent No.: US 9,701,392 B2
(45) Date of Patent: *Jul. 11, 2017

(54) JOINT

(71) Applicants: Airbus Operations Limited, Bristol (GB); Airbus Operations (S.A.S.), Toulouse (FR)

(72) Inventors: Rhona Whitlock, Bristol (GB); Massimo Del Tin, Bristol (GB); Peter Dalton, Bristol (GB); George Ford, Bristol (GB); Michael John Hill, Bristol (GB); Adrian Huntbatch, Bristol (GB); Laurence Breeze, Bristol (GB); Alain Depeige, Tournefeuille (FR)

(73) Assignees: Airbus Operations Limited, Bristol (GB); Airbus Operations (S.A.S.), Toulouse (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,823

(22) Filed: Jul. 22, 2016

(65) Prior Publication Data

US 2016/0332720 A1 Nov. 17, 2016

Related U.S. Application Data

(63) Continuation of application No. 14/006,380, filed as application No. PCT/GB2012/050644 on Mar. 22, 2012, now Pat. No. 9,422,049.

(30) Foreign Application Priority Data

Mar. 28, 2011 (GB) .................................. 1105104.2

(51) Int. Cl.
*B64C 3/26* (2006.01)
*B64C 3/18* (2006.01)
*B64C 23/06* (2006.01)

(52) U.S. Cl.
CPC ................ *B64C 3/26* (2013.01); *B64C 3/187* (2013.01); *B64C 23/065* (2013.01); *Y02T 50/164* (2013.01)

(58) Field of Classification Search
CPC ........ B64C 3/87; B64C 23/065; Y02T 50/164
(Continued)

(56) References Cited

U.S. PATENT DOCUMENTS 7,658,348 B1 * 2/2010 Braly ........................ B64C 1/26
244/119
7,975,965 B2 * 7/2011 Ackermann .............. B64C 3/18
244/124
(Continued)

FOREIGN PATENT DOCUMENTS

CN   101 214 853   7/2008
DE   195 29 706    2/1997
(Continued)

OTHER PUBLICATIONS

International Search Report for PCT/GB2012/050644, mailed Sep. 2, 2013 (5 pages).
(Continued)

*Primary Examiner* — Brian M O'Hara
*Assistant Examiner* — Keith L Dixon
(74) *Attorney, Agent, or Firm* — Nixon & Vanderhye P.C.

(57) ABSTRACT

A joint including first and second rib components, the first rib having an abutment surface and a plurality of lugs disposed adjacent to the abutment surface; and the second rib having an abutment surface and a plurality of lugs disposed adjacent to the abutment surface, wherein the abutment surfaces of the respective ribs are abutting and joined with a tension joint, and wherein the lugs are pinned to form a pinned lug joint by aligning respective holes in the plurality of lugs such that the lugs of the first and second ribs (Continued)

are interleaved and have one or more pins passing through the aligned lug holes. The joint may be used for attaching a wing tip device to the outboard end of an aircraft wing.

24 Claims, 6 Drawing Sheets

(58) Field of Classification Search
  USPC .............................................. 244/131, 199.4
  See application file for complete search history.

(56) References Cited

U.S. PATENT DOCUMENTS

| | | | | |
|---|---|---|---|---|
| 8,454,261 | B2 * | 6/2013 | Horst | B61D 37/003 244/118.5 |
| 8,844,869 | B2 * | 9/2014 | Andre | B64C 1/26 244/119 |
| 9,422,049 | B2 * | 8/2016 | Whitlock | B64C 3/187 |
| 9,499,255 | B2 * | 11/2016 | Chaussee | B64C 23/065 |
| 2007/0018049 | A1 * | 1/2007 | Stuhr | B64C 23/065 244/124 |
| 2009/0283639 | A1 | 11/2009 | Ackermann et al. | |

FOREIGN PATENT DOCUMENTS

| | | |
|---|---|---|
| WO | 2008022428 | 2/2008 |
| WO | 2008061739 | 5/2008 |

OTHER PUBLICATIONS

Written Opinion for PCT/GB2012/050644, mailed Sep. 2, 2013 (7 pages).

UKIPO Search Report for GB 1105104.2 dated Jul. 13, 2011 (1 page).

* cited by examiner

Detail A

JOINT

RELATED APPLICATIONS

This application is a continuation of U.S. patent application Ser. No. 14/006,380 filed Sep. 20, 2013, which is the U.S. national phase of International Application PCT/GB2012/050644 filed Mar. 22, 2012, which designated the U.S. and claims priority to GB Patent Application 1105104.2 filed 28 Mar. 2011, wherein these applications are incorporated by reference in their entirety.

FIELD OF THE INVENTION

The present invention relates to a joint between rib components. In particular, though not exclusively, the ribs are aircraft components. In a preferred implementation, the joint is used to attach a wing tip device to the outboard end of an aircraft wing.

BACKGROUND OF THE INVENTION

A tension joint typically comprises two or more abutting components joined with one or more tension fittings. The tension fitting may, for example, be a nut and bolt combination.

An aircraft wing typically comprises a wing box structure including front and rear spars, a plurality of ribs extending between the spars, and an upper wing cover and a lower wing cover each extending between the spars.

A wing tip device is a device that may be attached to the outboard end of a wing to reduce induced drag on the wing. In the case of e.g. an aircraft wing this can lead to improved fuel efficiency and reduced carbon emissions. Several different types of wing tip device are known, including the winglet, the wing tip fence, and the raked wing tip for example.

The attachment between the outboard end of an aircraft wing and the inboard end of a wing tip device has traditionally been made using a tension type joint. The tension joint may for example include one or more rows of tension bolts, each row extending in a substantially chord-wise direction.

As wing tip device technology improves, the aerodynamic loads that can beneficially be generated by the wing tip device, and which need to be transferred into the wing, has also increased. However, the area at the outboard end of the wing available for attaching the wing tip device remains relatively small, which poses difficulties in terms of successfully distributing these higher loads. In addition, the weight of the wing tip device may be increased due to the higher loads involved, which poses difficulties in terms of handling the wing tip device during assembly of the wing and during maintenance should the wing tip device need to be removed.

SUMMARY OF THE INVENTION

A first aspect of the invention provides a joint comprising first and second rib components, the first rib having an abutment surface and a plurality of lugs disposed adjacent to the abutment surface; and the second rib having an abutment surface and a plurality of lugs disposed adjacent to the abutment surface, wherein the abutment surfaces of the respective ribs are abutting and joined with a tension joint, and wherein the lugs are pinned to form a pinned lug joint by aligning respective holes in the plurality of lugs such that the lugs of the first and second ribs are interleaved and have one or more pins passing through the aligned lug holes.

The invention is advantageous in that the combination of a tension joint and a pinned lug joint enables the efficient transfer of complex loads and moments across the joint. The invention is particularly advantageous where the joint is optimised for weight and/or packaging constraints.

The lugs of the respective ribs preferably project beyond their respective abutment surfaces.

The tension joint may include a plurality of tension bolts. A nut may be associated with each tension bolt. In particular, the nut may be a barrel nut.

The pinned lug joint may comprise two or more groups of lugs on each side of the joint. The groups of lugs may be spaced apart by a distance greater than the lug spacing within each group. One of the pins may be associated with each of the groups of lugs.

The, or each pin, may include a nut. The nut may be used for retaining the pin within the pinned lug joint.

The pinned lug joint may further comprise a pin retaining device associated with the or each pin.

Each of the first and second rib components may be integrally formed. For example, each rib may be machined metallic component, or may be a co-cured fibre-reinforced composite component.

The ribs may define a space between the abutting surfaces of the tension joint and the pinned lug joint for receiving one or more systems. The systems may run substantially parallel to the plane of the longitudinal axis of the ribs.

In one embodiment, the ribs are aircraft components.

A second aspect of the invention provides an aircraft wing comprising a wing box structure, the wing box structure including front and rear spars, a plurality of ribs extending between the spars, and an upper wing cover and a lower wing cover each extending between the spars, and the wing further comprising a wing tip device attached to the outboard end of the wing, wherein the wing tip device is joined to the wing by a joint in accordance with the first aspect of the invention in which the first rib is an outboard rib of the wing and the second rib is an inboard rib of the wing tip device.

The wing tip device may include an upper cover and a lower cover, and outer surfaces of the upper and lower covers of the wing and wing tip device may be substantially flush across the joint.

The wing tip device may include an essentially planar winglet and a curved transition region arranged between the wing and the winglet. The transition region may have a curvature of increasing local dihedral in the outboard direction. The dihedral angle may increase from a low level, or even zero, at the inboard end of the wing tip device. The local dihedral in the transition region may be continuously increasing in the outboard direction.

Within the joint, the tension joint is preferably disposed nearest the upper wing cover and the pinned lug joint is preferably disposed nearest the lower wing cover.

The tension joint may include a plurality of tension fitting bolts arranged spaced in a chord-wise direction. One of the fitting bolts may be located in a bolt hole with a tighter tolerance than the other tension fitting bolts. The tightly toleranced tension fitting bolt may be disposed in a central part of the tension fitting in the chord-wise direction. This tightly toleranced tension fitting bolt may be adapted to transfer the drag load generated by the wing tip device during flight into the wing.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
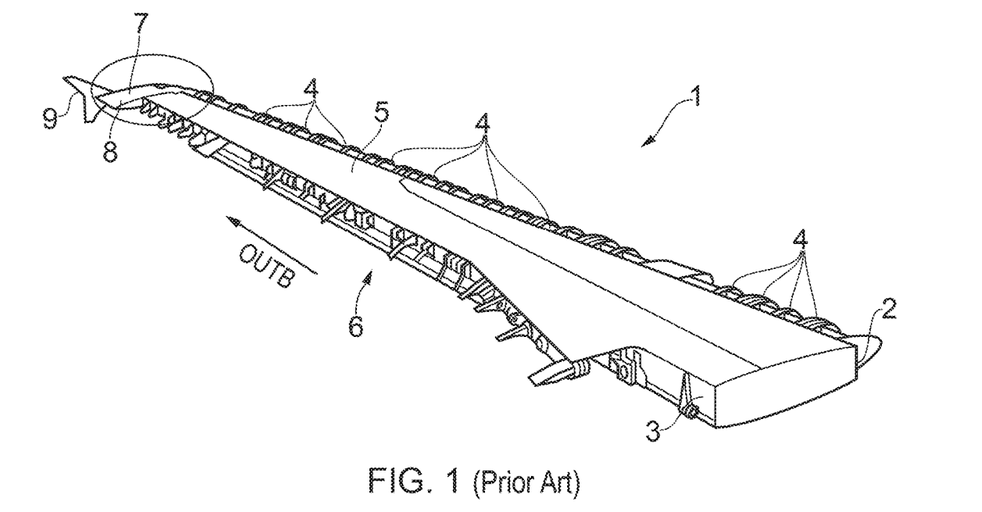
FIG. 1 illustrates an aircraft wing box with a wing tip fence attached to the outboard end of the wing in accordance with the prior art.

FIG. 1 illustrates a prior art aircraft wing 1 having a conventional wing box structure including a front spar 2, a rear spar 3, a plurality of ribs 4 extending in a chord-wise direction and attached to the front and rear spars 2, 3, and upper and lower wing covers 5, 6 which are attached to the front and rear spars 2, 3 and to the ribs 4.

At its outboard end, the wing 1 is attached to a wing tip device 7 which is used to reduce the induced drag on the wing leading to improved fuel efficiency and reduced carbon emissions. The wing tip device 7 illustrated in FIG. 1 is of a type known as a "wing tip fence". The wing tip fence 7 includes a wing tip portion 8 and a tip fence 9, which essentially comprises a substantially planar end plate extending above and below the wing.

The wing tip device 7 is attached to the outboard end of the wing 1 (circled in FIG. 1) by a tension joint. The tension joint is shown in detail in FIG. 2. The outboard end of the wing 1 includes the outward wing rib 4a extending between the upper and lower wing covers 5, 6. The outboard wing rib 4a has a generally C-shaped cross-section.

Figure 2:
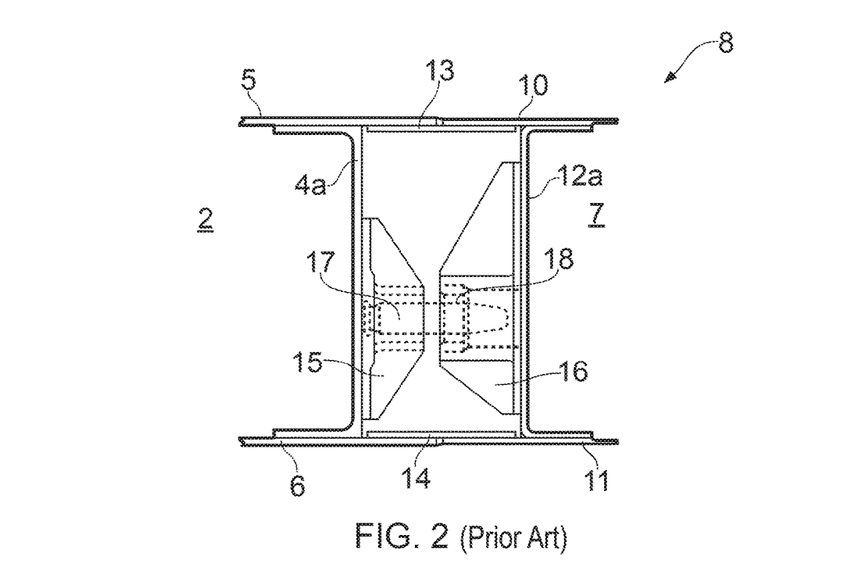
FIG. 2 illustrates a partial section view of the tension joint used to attached the prior art wing tip fence to the outboard end of the wing illustrated in FIG. 1.

The wing tip portion 8 of the wing tip device 7 includes an upper tip device cover 10 and a lower tip device cover 11. The wing tip portion 8 further includes a plurality of ribs 12 and the inboard rib 12a is shown in FIG. 2. The inboard rib 12a has a generally C-shaped cross-section and is arranged back-to-back with the outboard wing rib 4a. In other words, the ribs 4a and 12a each have a substantially vertical web with oppositely facing upper and lower flanges.

The upper wing cover 5 and the upper wing tip device cover 10 are arranged such that their outer aerodynamic surfaces are substantially flush across the joint. Similarly, the lower wing cover 6 and the lower wing tip cover 11 are arranged with their outer aerodynamic surfaces lying substantially flush across the joint. Butt-straps 13, 14 are used to connect the inner surfaces of the upper covers 5, 10 and the lower covers 6, 11. The butt-straps 13, 14 are fastened to the covers 5, 10 and 6, 11.

The joint between the wing 1 and wing tip device 7 is a tension joint comprising a first integrally formed rib fitting 15 on the wing rib 4a and a second integrally formed rib fitting 16 on the inboard wing tip rib 12a. The fittings 15, 16 are joined by a plurality of tension fittings comprising a bolt 17 and respective nut 18. The tension fittings are spaced generally chord-wise along the ribs 4a, 12a to form the joint.

Figure 3:
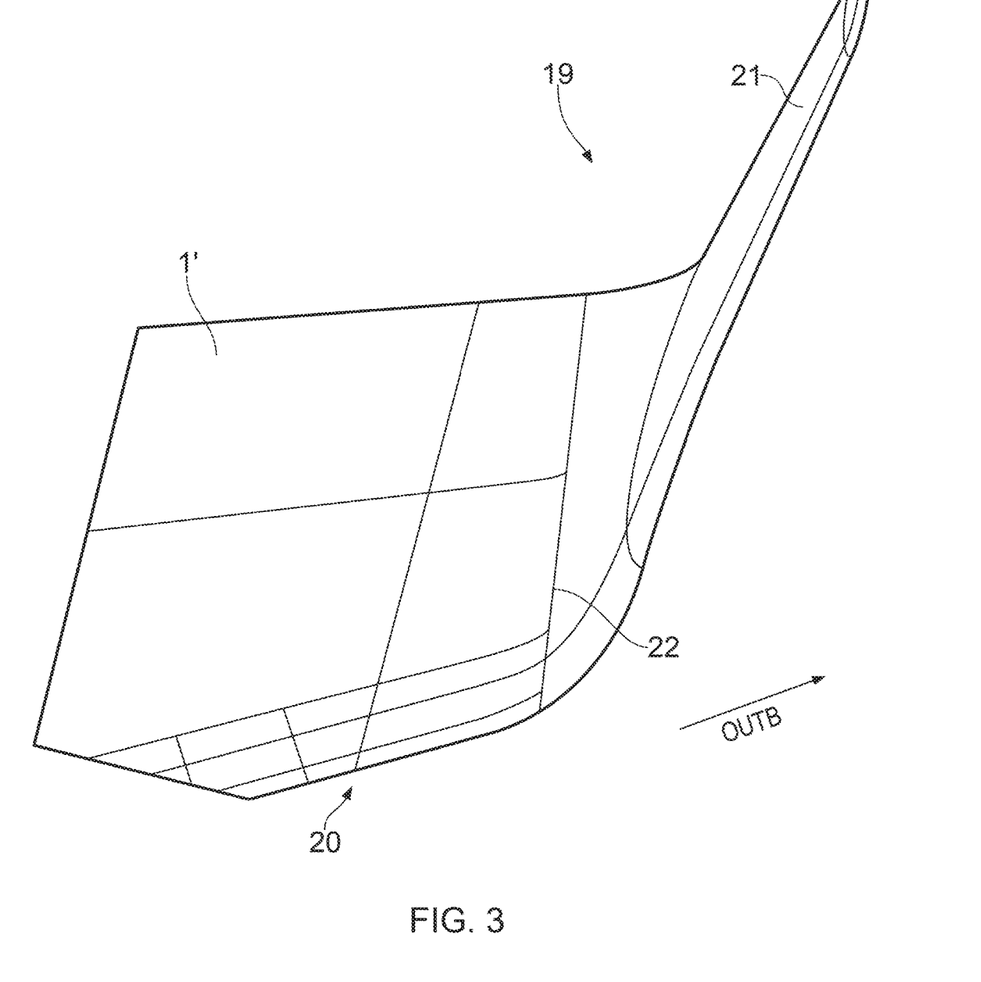
FIG. 3 illustrates a alternative wing tip device, including a winglet, attached to the outboard end of a wing in accordance with an embodiment of this invention.

Turning now to FIG. 3, there is shown an improved wing tip device 19 that has been developed to provide enhanced aerodynamic performance, as compared with the wing tip device 7 shown in FIG. 1. The wing tip device 19 is intended to be attached to a wing 1' that is substantially the same as the wing 1 with only minor modification to the outboard end of the wing. The wing tip device 19 is substantially as described in WO2008/061739A, the contents of which are incorporated herein by reference. The wing tip device 19 is attached to the outboard end of wing 1' by a combination joint 20, which will be described in detail below.

The wing tip device 19 generally comprises a substantially planar winglet 21 and a transition region 22 extending between the joint 20 and the winglet 21. The transition region 22 has a curvature of local dihedral that increases from a low angle, or an angle of approximately zero, at or near the joint 20 and increases in the outboard direction. The winglet 21 extends upwardly from the transition region 22 and is inclined with respect to the vertical plane. In one example, the wing tip device 19 is approximately 2.5 m tall and weighs approximately 120 kg.

As compared with the wing tip fence device 7 as shown in FIG. 1, the wing tip device 19 shown in FIG. 3 is taller, heavier and generates significantly higher bending and yaw moments, which must be efficiently transferred by the joint 20 into the wing 1'.

Analysis has shown that the tension type joint illustrated in FIG. 2 could not transfer the higher bending and yaw moments at the same time as the shear loading required over the relatively small area (less than 0.1 m$^2$) available at the outboard end of the wing 1' available for attaching the wing tip device 19.

Figure 4:
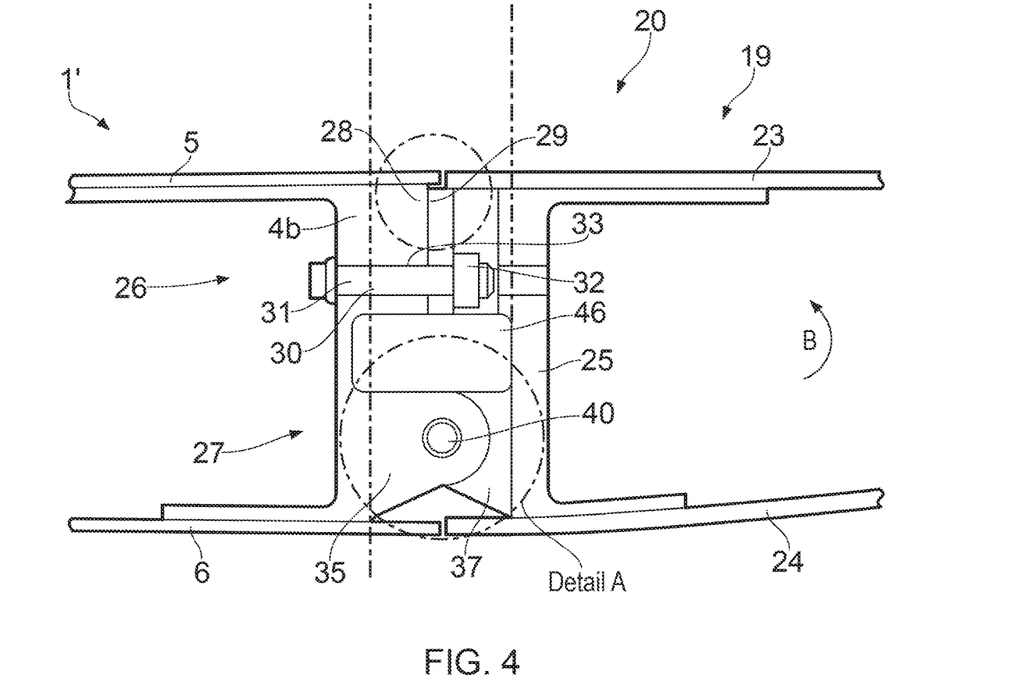
FIG. 4 illustrates a partial section view of a combined tension joint and pinned lug joint for attaching the wing tip device illustrated in FIG. 3 to the outboard end of the wing.

FIG. 4 illustrates a partial section view of the combination joint 20, which includes a tension joint and pinned lug joint. The wing 1' includes the same upper and lower wing covers 5, 6 as shown in FIG. 2 but features a modified outboard rib 4b instead of the rib 4a. On the wing tip device side of the joint 20 the wing tip device 19 includes an upper cover 23, a lower cover 24 and an inboard wing tip device rib 25. The outboard wing rib 4b and the inboard wing tip device rib 25 have a generally C-shaped section and are arranged back-to-back. The combination joint 20 includes the outboard wing rib 4b, the inboard wing tip device rib 25, an upper tension fitting 27 and a lower pinned lug joint 27.

Figure 5:
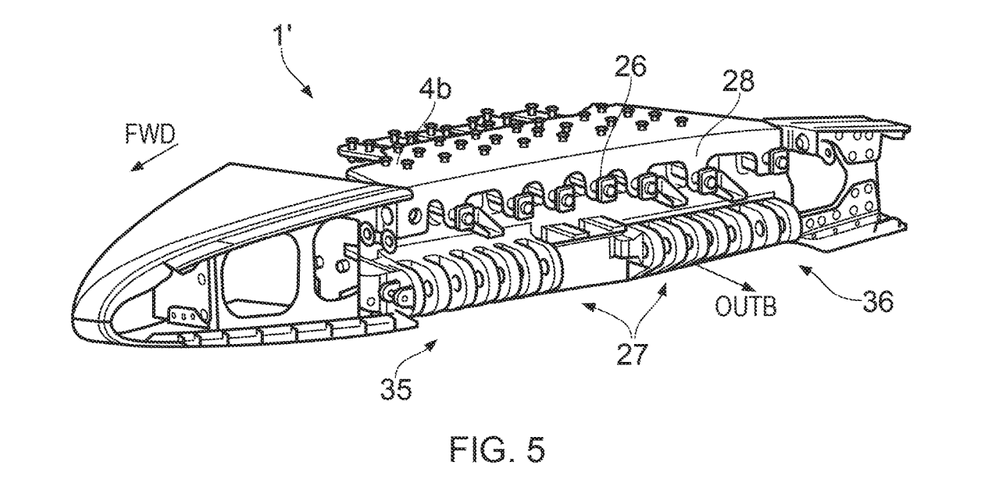
FIG. 5 illustrates a cut away view of the wing box rib at the outboard end of the wing, which forms part of the combination joint illustrated in FIG. 4.
Figure 6:
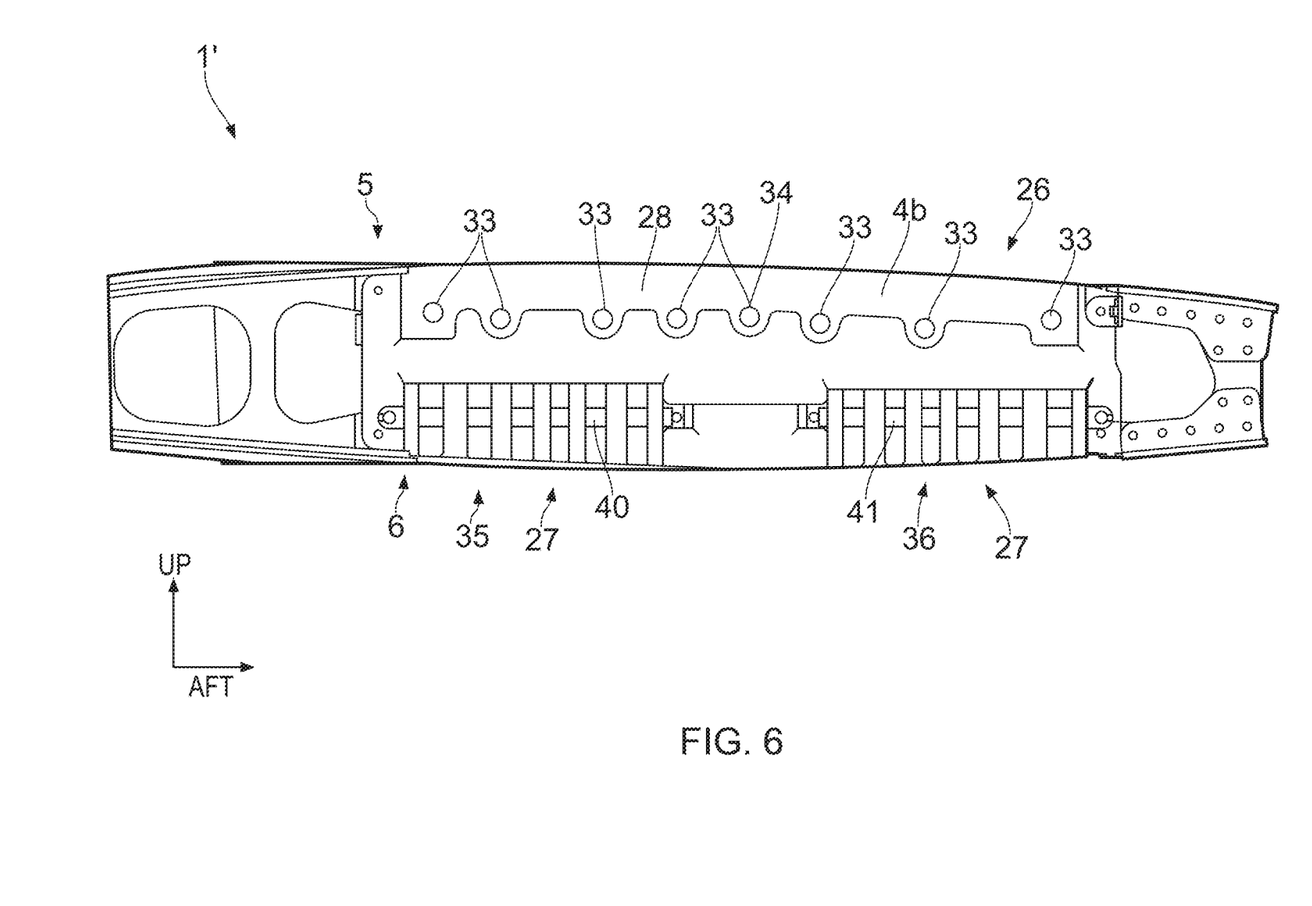
FIG. 6 illustrates an end view of the wing box rib illustrated in FIG. 5.
Figure 7:
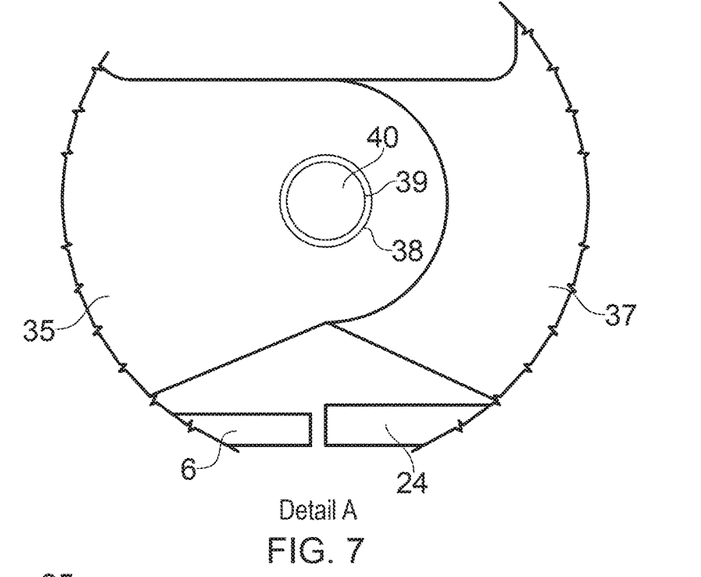
FIG. 7 illustrates detail A of FIG. 4.

The tension joint 26 comprises a first abutment surface 28 of the outboard wing rib 4b, a second abutment surface 29 of the inboard wing tip device rib 25 and a plurality of tension fittings 30. The tension fittings 30 each include a tension bolt 31 and barrel nut 32. As best shown in FIGS. 5 and 6, the tension joint includes eight tension fittings arranged spaced generally chord-wise across the joint 26. Each tension bolt 31 is disposed within a through-hole 33 formed in the ribs 4b and 25. Tightening the barrel nuts 32 to a predetermined torque generates a desired predetermined tension in the bolts 31 so as to force the abutment surfaces 28, 29 of the respective ribs 4b, 25 into abutment.

By positioning the tension joint 26 nearest the upper wing cover 5, in the 'up bending' case (indicated in FIG. 4 by the anti-clockwise moment arrow B), the combination joint 20 relies upon the abutment between the abutting surfaces 28, 29 of the ribs 4b, 25. Since the tension part of the joint is disposed nearer the upper wing cover 5, the increased moment arm from the centre of the joint acts to reduce the end loads at the interface of the abutting surfaces 28, 29. This helps to ensure efficient transfer of the loads from the wing tip device 19 into the wing 1'.

One of the tension fittings 34 in the central part of the joint (as viewed in the chord-wise direction) is more tightly toleranced than the other of the tension fittings 30. In other words, the tolerance of the tension bolt 31 in the through-hole 33 at tension fitting 34 is more tightly toleranced than that of the other tension fittings. This is to ensure that the drag load transferred from the wing tip device 19 into the wing 1 is carried as a shear load by that one tension fitting 34. The tight tolerance for the tension fitting 34 guarantees that the fitting 34 carries the drag load whilst the remaining seven tension fittings 30 act as a fail-safe. The tension fitting 34, being located in the central part of the joint, has been selected for this purpose since the combination of shear and tensile loading on this fitting is reduced.

The pinned lug joint 27 will now be described in detail with reference to FIGS. 4 to 9. The pinned lug joint 27 is disposed nearest the lower wing cover 6 offset below the vertical centreline of the joint 20. The pinned lug joint 27 includes a group of forward lugs 35 and a group of aft lugs 36 on the wing wide of the joint, and a corresponding group of forward lugs 37 and group of aft lugs on the wing tip device side of the joint. The groups of forward lugs 35, 37 on each side of the joint 27 are oppositely facing (inboard/outboard). Each lug within the joint 27 includes a lug hole 38 having a bush 39, which may be freeze fitted for improved fatigue and damage tolerance performance. The forward pin 40 passes through the aligned lug holes 38 of the groups of forward lugs 35, 37, and an aft pin 41 passes through the lug holes 38 of the aft groups of lugs. Each of the multi-lug and pin arrangements which form the forward and aft pinned lug joints 27 comprise six lug pairs. The pinned lug joints 27 effectively transfer the bending, yaw and shear loads generated by the wing tip device 19 into the wing 1' during flight.

Figure 8:
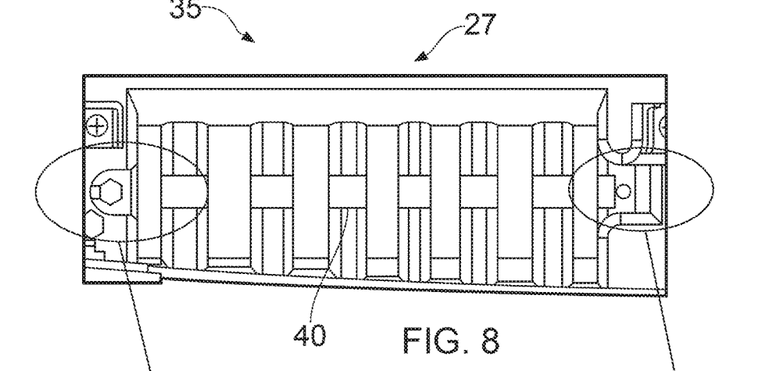
FIG. 8 illustrates a partial end view of the lugs on the wing side of the joint with the pin installed.
Figure 9A:
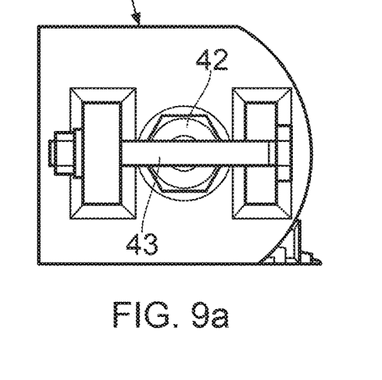
FIG. 9a illustrates in detail a retaining device for retaining one end of the pin illustrated in FIG. 8.
Figure 9B:
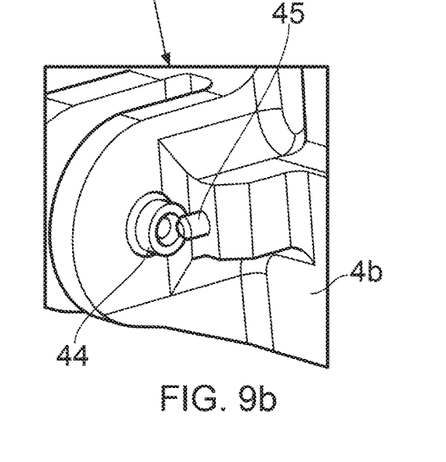
FIG. 9b illustrates in detail a retaining device for retaining the other end of the pin illustrated in FIG. 8.

As shown in FIGS. 8 and 9, each pin 40, 41 is retained such that the integrity of the pinned lug joints 27 is maintained even in the event of fracture of the pin 40, 41 during service. As shown in FIG. 9a, a barrel nut 42 on one end of pin 40 is retained by a retaining pin 43 having a pin axis disposed perpendicular, but in the same plane, as the axis of pin 40. As shown in FIG. 9b, the head 44 of pin 40 is locked by retained pin 45 which projects through the wing rib 4b.

Figure 10:
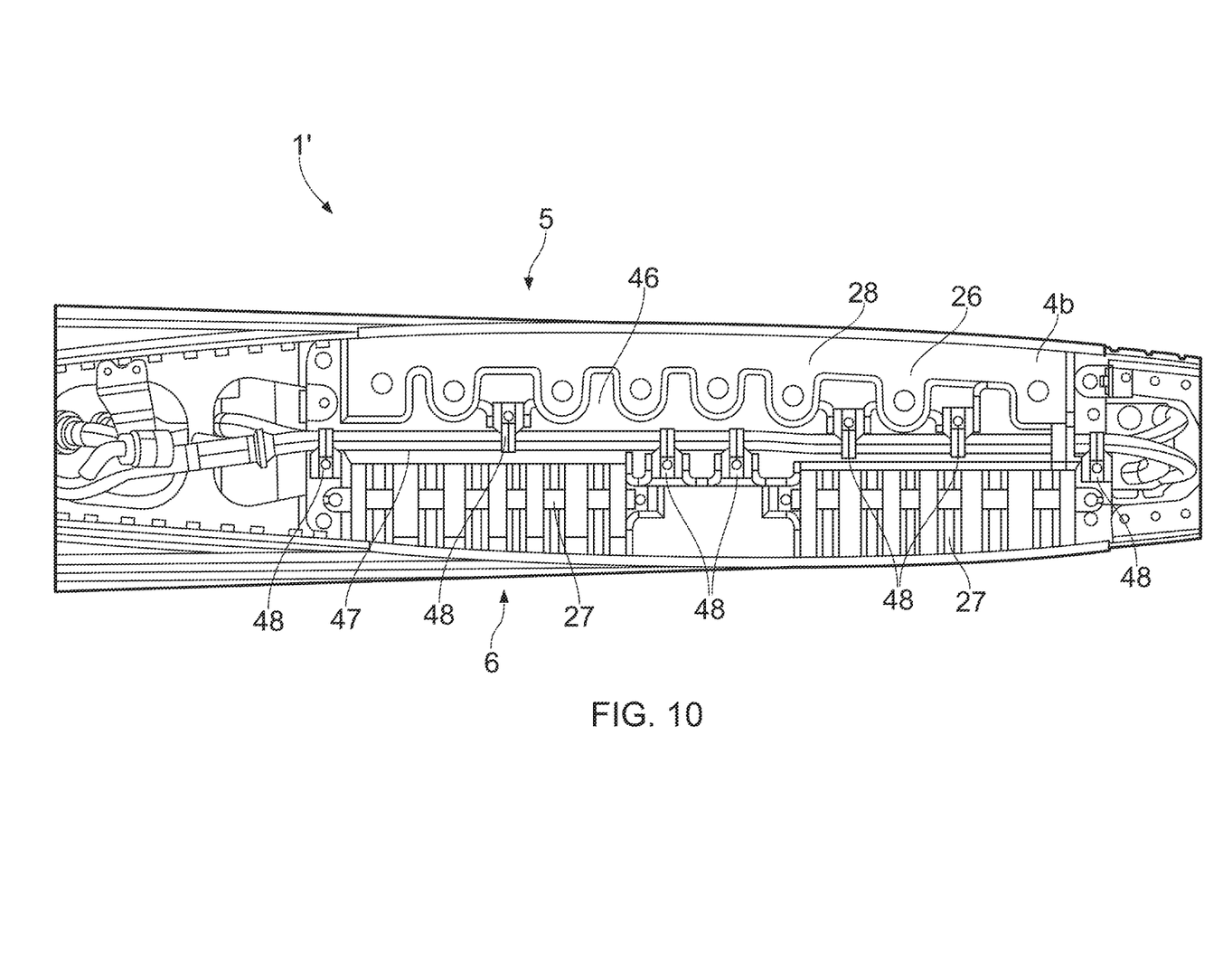
FIG. 10 illustrates the outboard end of the wing with the wing tip device removed so as to reveal the system runs traversing chord-wise between the upper tension joint and the lower pinned lug joint.

Returning to FIG. 4, it can be seen that between the upper tension joint 26 and the lower pinned lug joint 27 the back-to-back ribs 4b, 25 define a space 46, which is used to accommodate system runs traversing chord-wise between the leading and trailing edges of the wing 1'. FIG. 10 shows these system runs 47 passing through the space 46 and attached by a plurality of system brackets and cable ties 48 to the wing rib 4b.

Whilst in the embodiment described above the invention has been described in a preferred implementation for attaching a wing tip device to the outboard end of an aircraft wing, it will be appreciated that the joint of this invention has other applications within an aircraft, and also outside the aviation industry. For example, this type of joint maybe used to connect the inboard end of the aircraft wing to an aircraft fuselage, or maybe use to connect a horizontal or vertical tail plane to a fuselage, for example. The combined tension and pinned lug joint may also be used to join fuselage sections, or wing sections, together. Other uses of this type of combination joint will be appreciated by those skilled in the art.

Other variants and modifications to the joint described in the embodiment above may also be made. For example, in the embodiment above the tension joint is disposed above the pinned lug joint but the relative positioning of these two different joint types may be reversed. Also, the pinned lug joint described above is essentially formed as two distinct multi-lug and pin arrangements. However, it will be appreciated that greater than two, or even a single multi-lug and pin arrangement may be used instead. The number of pins may be varied accordingly.

Although the invention has been described above with reference to one or more preferred embodiments, it will be appreciated that various changes or modifications may be made without departing from the scope of the invention as defined in the appended claims.

The invention is:

1. A joint comprising:
   first and second rib components,
   the first rib component having an abutment surface and a plurality of lugs disposed adjacent to the abutment surface; and
   the second rib component having an abutment surface and a plurality of lugs disposed adjacent to the abutment surface,
   wherein the abutment surfaces of the respective first and second rib components are abutting and joined with a tension fitting wherein at least a member of the tension fitting is under tension, and
   wherein the lugs are pinned to form a pinned lug joint by aligning respective holes in the plurality of lugs such that the lugs of the first and second rib components are interleaved and have one or more pins passing through the aligned lug holes.

2. The joint according to claim 1, wherein the lugs of the respective first or second rib components project beyond the abutment surfaces of the respective first or second rib components.

3. The joint according to claim 1, wherein the tension fitting includes a plurality of tension bolts.

4. The joint according to claim 3, further comprising a nut associated with each tension bolt.

5. The joint according to claim 1, wherein the pinned lug joint comprises two or more groups of lugs on each side of the joint.

6. The joint according to claim 5, wherein the groups of lugs are spaced apart by a distance greater than a spacing between the lugs within each group.

7. The joint according to claim 5, wherein one of the pins is associated with each of the groups of lugs.

8. The joint according to claim 1, wherein at least one of the one or more pins includes a nut.

9. The joint according to claim 1, wherein the pinned lug joint further comprises a pin retaining device associated with the one or more pins.

10. The joint according to claim 1, wherein each of the first and second rib components is integrally formed.

11. The joint according to claim 1, wherein the first and second rib components define a space between the abutment surfaces and the plurality of lugs, wherein the space is configured to receive one or more systems.

12. The joint according to claim 1, wherein the first and second rib components are aircraft components.

13. An aircraft wing comprising:
a wing box structure, the wing box structure including front and rear spars, a plurality of ribs extending between the front and rear spars, and an upper wing cover and a lower wing cover each extending between the front and rear spars, and
a wing tip device attached to an outboard end of the wing, wherein the wing tip device is joined to the wing by a joint in accordance with claim 1 in which the first rib component is an outboard rib component of the wing and the second rib component is an inboard rib component of the wing tip device.

14. The aircraft wing according to claim 13, wherein the wing tip device includes an upper cover and a lower cover, and outer surfaces of the upper and lower covers of the wing and wing tip device are substantially flush across the joint.

15. The aircraft wing according to claim 13, wherein the wing tip device includes an essentially planar winglet and a curved transition region arranged between the wing and the winglet.

16. The aircraft wing according to claim 15, wherein the transition region has a curvature of increasing local dihedral in an outboard direction.

17. The aircraft wing according to claim 13, wherein within the joint, the tension joint is disposed nearest the upper wing cover and the pinned lug joint is disposed nearest the lower wing cover.

18. The aircraft wing according to claim 17, wherein the tension fitting includes a plurality of tension joint fitting bolts spaced in a chord-wise direction, and wherein one of the tension fitting bolts is located in a bolt hole with a tighter tolerance than the other tension fitting bolts.

19. The aircraft wing according to claim 18, wherein the tighter tolerance tension fitting bolt is disposed in a central part of the tension fitting in the chord-wise direction.

20. The joint according to claim 1 wherein the tension fitting includes a tension bolt.

21. The joint according to claim 20 wherein a nut is arranged with the bolt such that the bolt is under tension.

22. The joint according to claim 1 wherein the tension fitting forces the abutment surfaces into abutment.

23. The joint according to claim 1 wherein the tension fitting is one of a plurality of the tension fittings.

24. A joint comprising:
first and second rib components,
the first rib component includes a first abutment surface and a first row of lugs adjacent the first abutment surface, wherein the lugs in the first row each have a hole and the holes are aligned along a centerline; and
the second rib component includes a second abutment surface and a second row of lugs adjacent the second abutment surface, wherein the lugs of the second row each have a hole and the holes are aligned along the centerline;
a pin aligned with the centerline and extending through at least one of the holes in the first row of lugs and at least one of the holes in the second row of lugs;
a tension fitting aligned with the first and second abutment surfaces, wherein the tension fitting includes a member under tension and the tension fitting applies a force biasing together the first and second abutment surfaces such that the first and second abutment surfaces are in contact with each other.

\* \* \* \* \*